Figure 1:
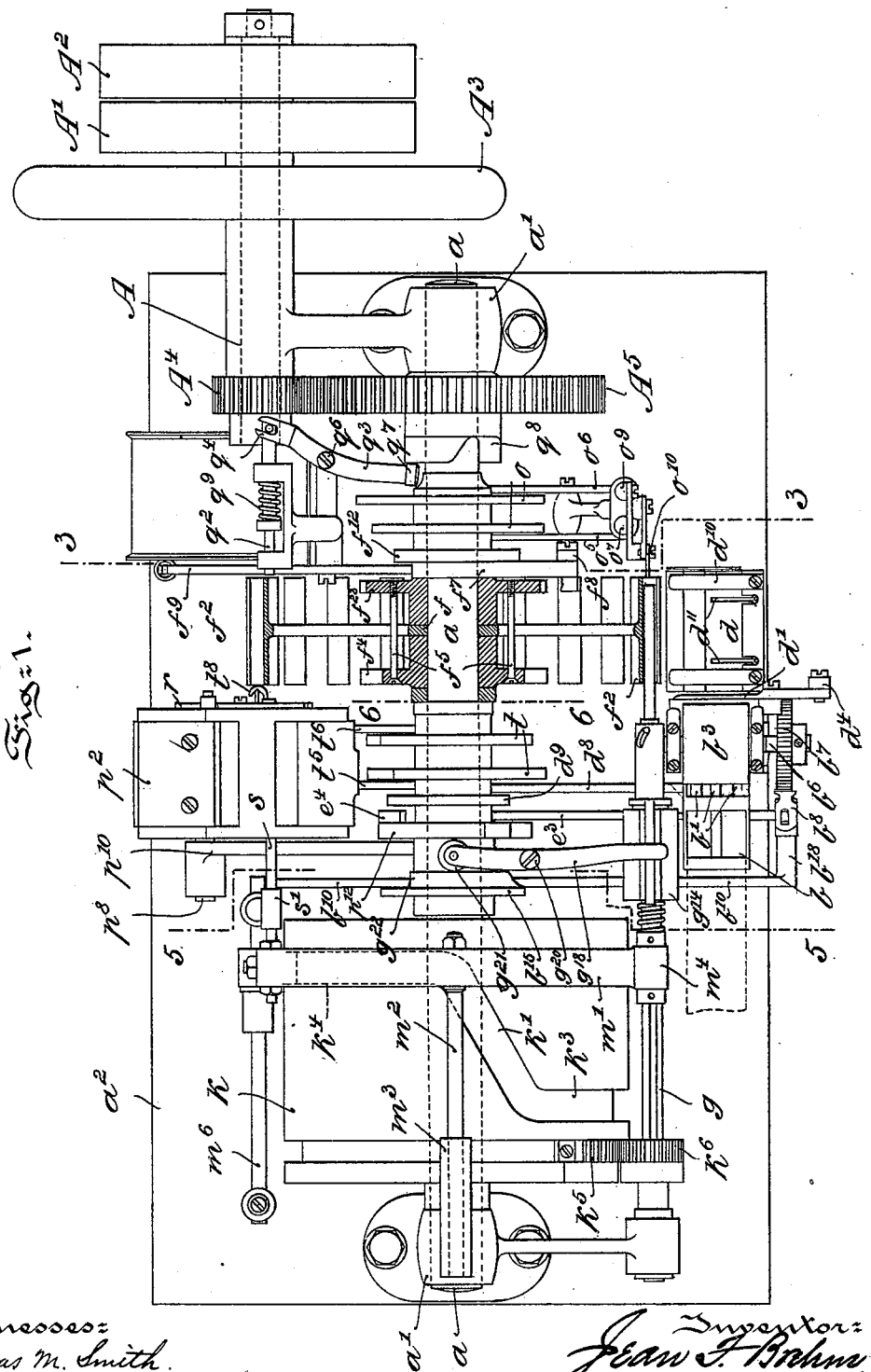

No. 636,625. Patented Nov. 7, 1899.
J. F. BREHM.
CIGARETTE MACHINE.
(Application filed June 23, 1898.)
(No Model.) 7 Sheets—Sheet 1.

Witnesses:
Thomas M. Smith.
Richard C. Maxwell.

Inventor:
Jean F. Brehm,
By J. Walter Douglas
Attorney.

No. 636,625. Patented Nov. 7, 1899.
J. F. BREHM.
CIGARETTE MACHINE.
(Application filed June 23, 1898.)
(No Model.) 7 Sheets—Sheet 2.

Witnesses:
Thomas M. Smith
Richard C. Maxwell

Inventor:
Jean F. Brehm,
By J. Walter Douglass
Attorney.

No. 636,625. Patented Nov. 7, 1899.
J. F. BREHM.
CIGARETTE MACHINE.
(Application filed June 23, 1898.)
(No Model.) 7 Sheets—Sheet 3.
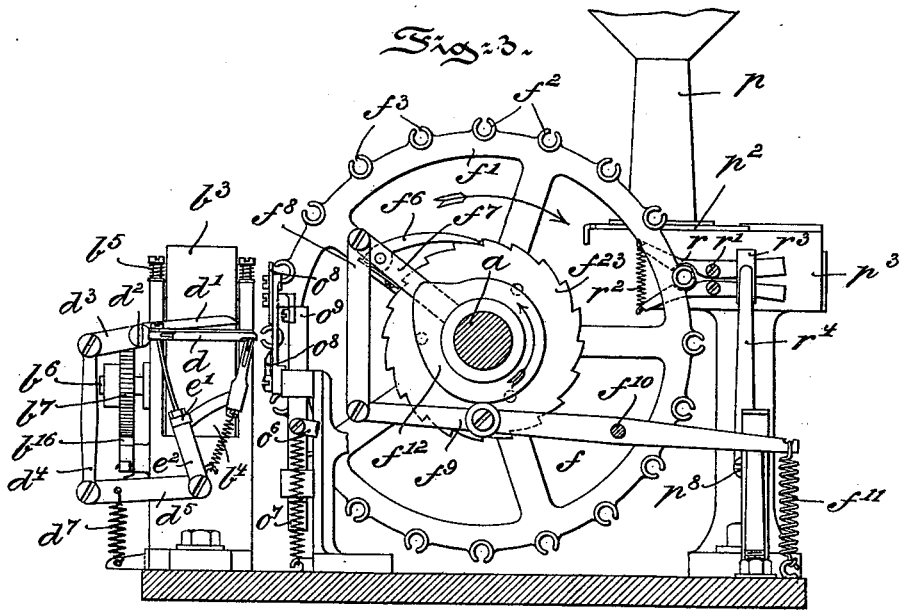
Fig. 3.
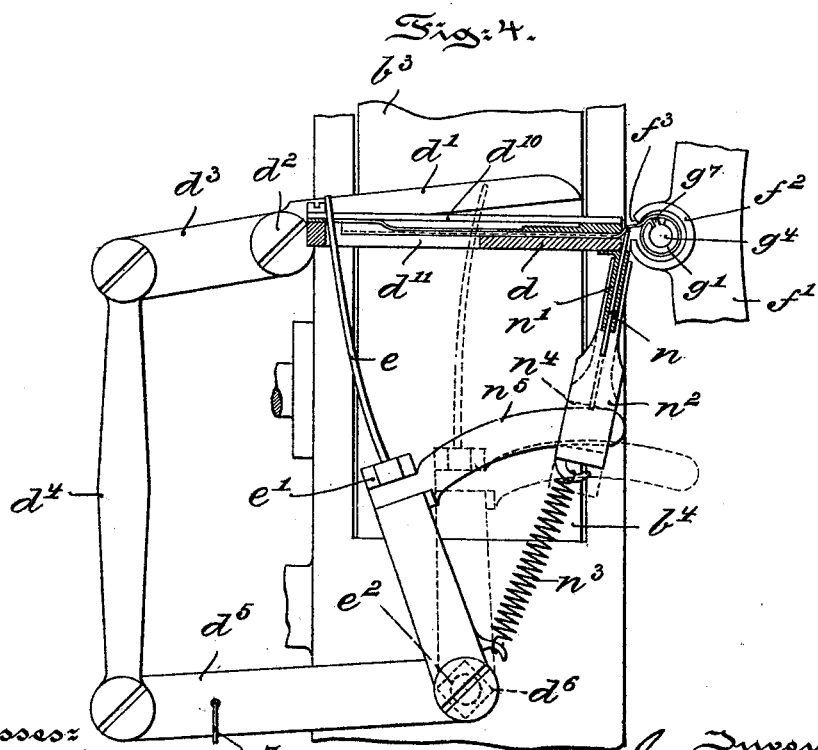
Fig. 4.
Witnesses:
Thomas M. Smith
Richard C. Maxwell
Inventor:
Jean F. Brehm
by J. Walter Douglas
Attorney No. 636,625. Patented Nov. 7, 1899.
J. F. BREHM.
CIGARETTE MACHINE.
(Application filed June 23, 1898.)
(No Model.) 7 Sheets—Sheet 4.
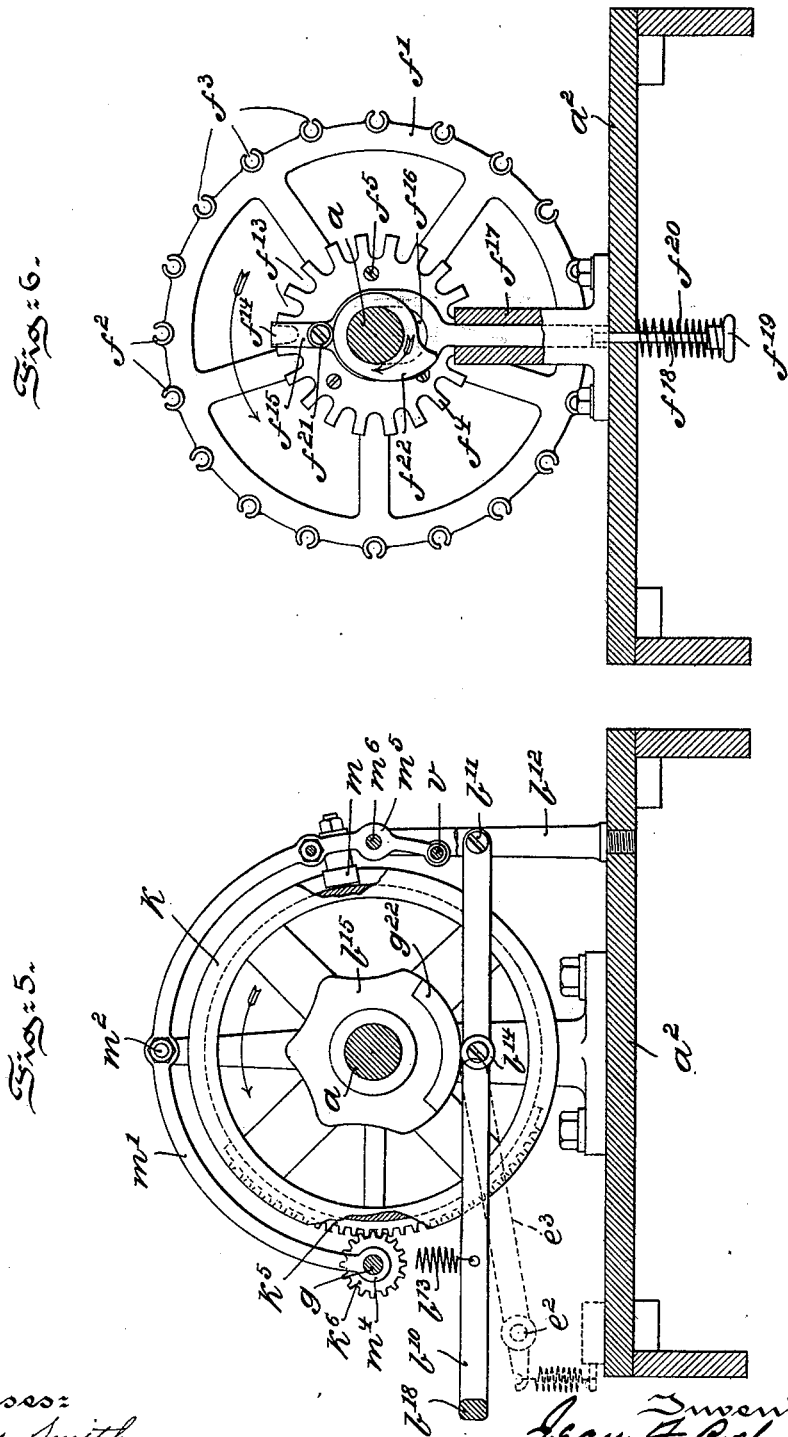
Witnesses:
Thomas M. Smith
Richard C. Maxwell
Inventor:
Jean F. Brehm
By J. Walter Douglas
Attorney No. 636,625. Patented Nov. 7, 1899.
J. F. BREHM.
CIGARETTE MACHINE.
(Application filed June 23, 1898.)
(No Model.) 7 Sheets—Sheet 5.

Witnesses:
Thomas M. Smith
Richard E. Maxwell

Inventor:
Jean F. Brehm,
By J. Walter Douglas
Attorney.

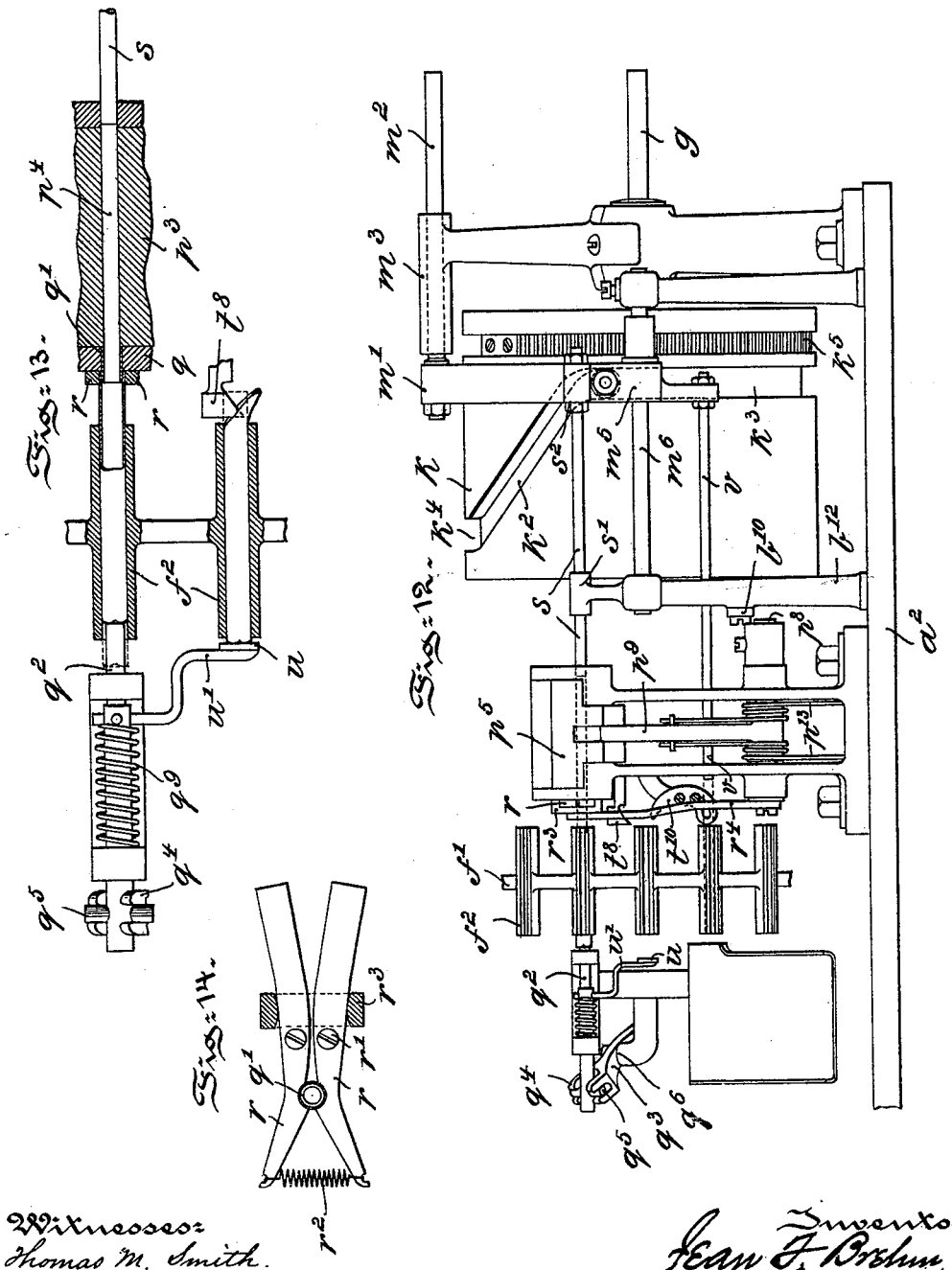

No. 636,625. Patented Nov. 7, 1899.
J. F. BREHM.
CIGARETTE MACHINE.
(Application filed June 23, 1898.)
(No Model.) 7 Sheets—Sheet 7.
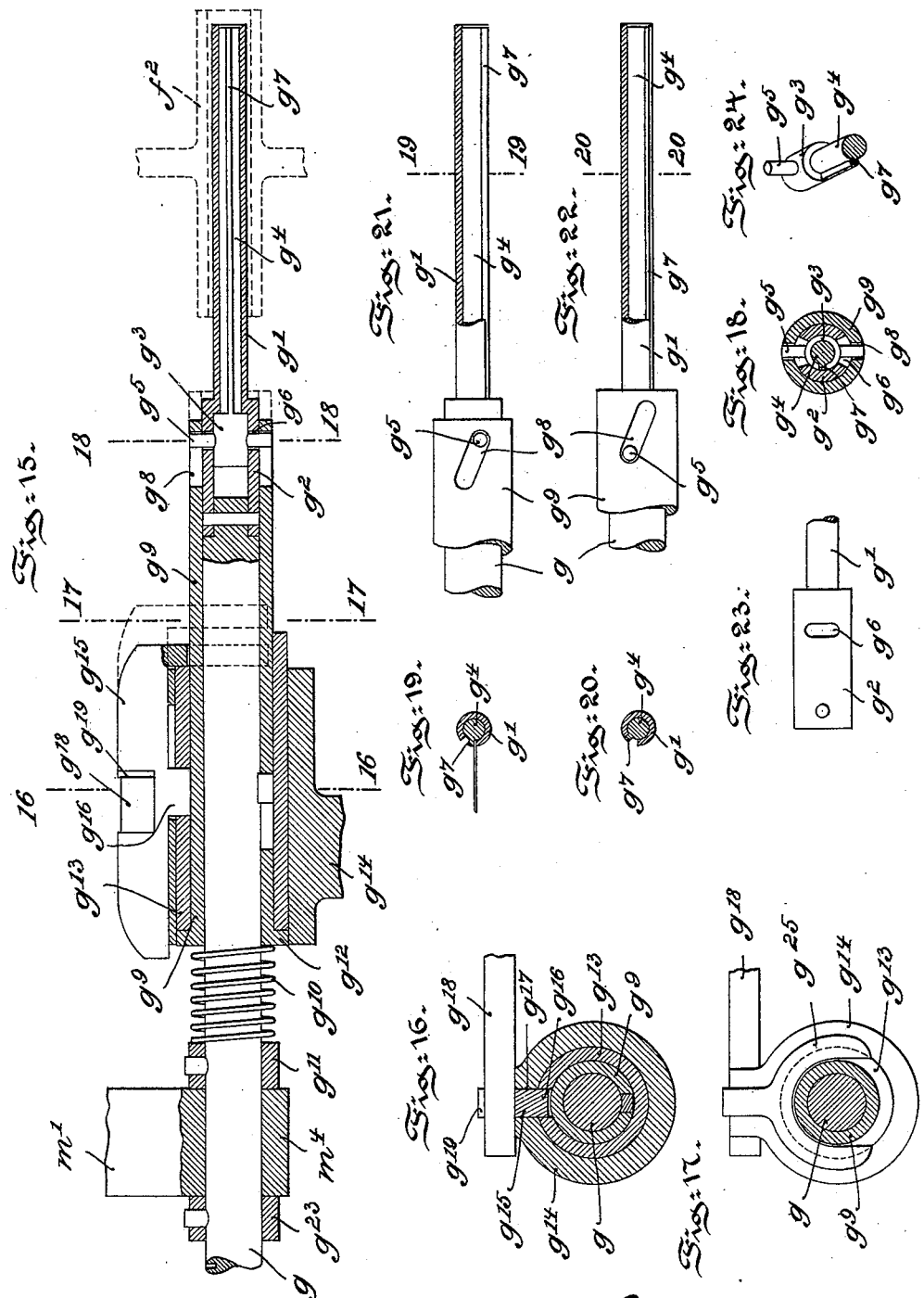

UNITED STATES PATENT OFFICE.

JEAN F. BREHM, OF PHILADELPHIA, PENNSYLVANIA, ASSIGNOR, BY DIRECT AND MESNE ASSIGNMENTS, TO GUIDO FERRARI AND RICHARD PLECHNER, OF SAME PLACE.

CIGARETTE-MACHINE.

SPECIFICATION forming part of Letters Patent No. 636,625, dated November 7, 1899.

Application filed June 23, 1898. Serial No. 684,202. (No model.)

*To all whom it may concern:*

Be it known that I, JEAN F. BREHM, a citizen of the United States, residing at the city of Philadelphia, in the county of Philadelphia and State of Pennsylvania, have invented certain new and useful Improvements in Cigarette-Machines, of which the following is a specification.

My invention has relation to that class of cigarette-machines such as is shown, described, and claimed in the Letters Patent No. 224,967, granted to J. deS. Ruiseco and de Castel-Angeli, February 24, 1880, wherein a paper tube is first formed by the machine and thereafter filled with tobacco and the ends of the tube closed or tucked in; and in such connection it relates particularly to the construction and arrangement of such a machine.

The principal objects of my invention are, first, to provide in a cigarette-machine mechanism of simple construction and efficient in operation for forming the paper tube and tucking in one end thereof; second, to provide in such a machine a simple and efficient mechanism for rotating the wheel or carrier in which the paper tube is formed, so as to present the tube to the filling mechanism; third, to provide in such a machine mechanism for feeding, measuring, and compressing the tobacco prior to presenting the same to the tube; fourth, to provide in such a machine a simple and efficient mechanism for filling the tube with the compressed tobacco and for closing the other end of said tube; fifth, to provide in such a machine a simple and efficient mechanism for ejecting the formed cigarette from the carrier, and, sixth, to so arrange and simplify the various mechanisms of the machine as to permit of the operation of the mechanisms from a single power-shaft.

My invention, stated in general terms, consists of a cigarette-machine constructed and arranged in substantially the manner hereinafter described and claimed.

The nature and scope of my invention will be more fully understood from the following description, taken in connection with the accompanying drawings, forming part hereof, in which—

Figure 2:
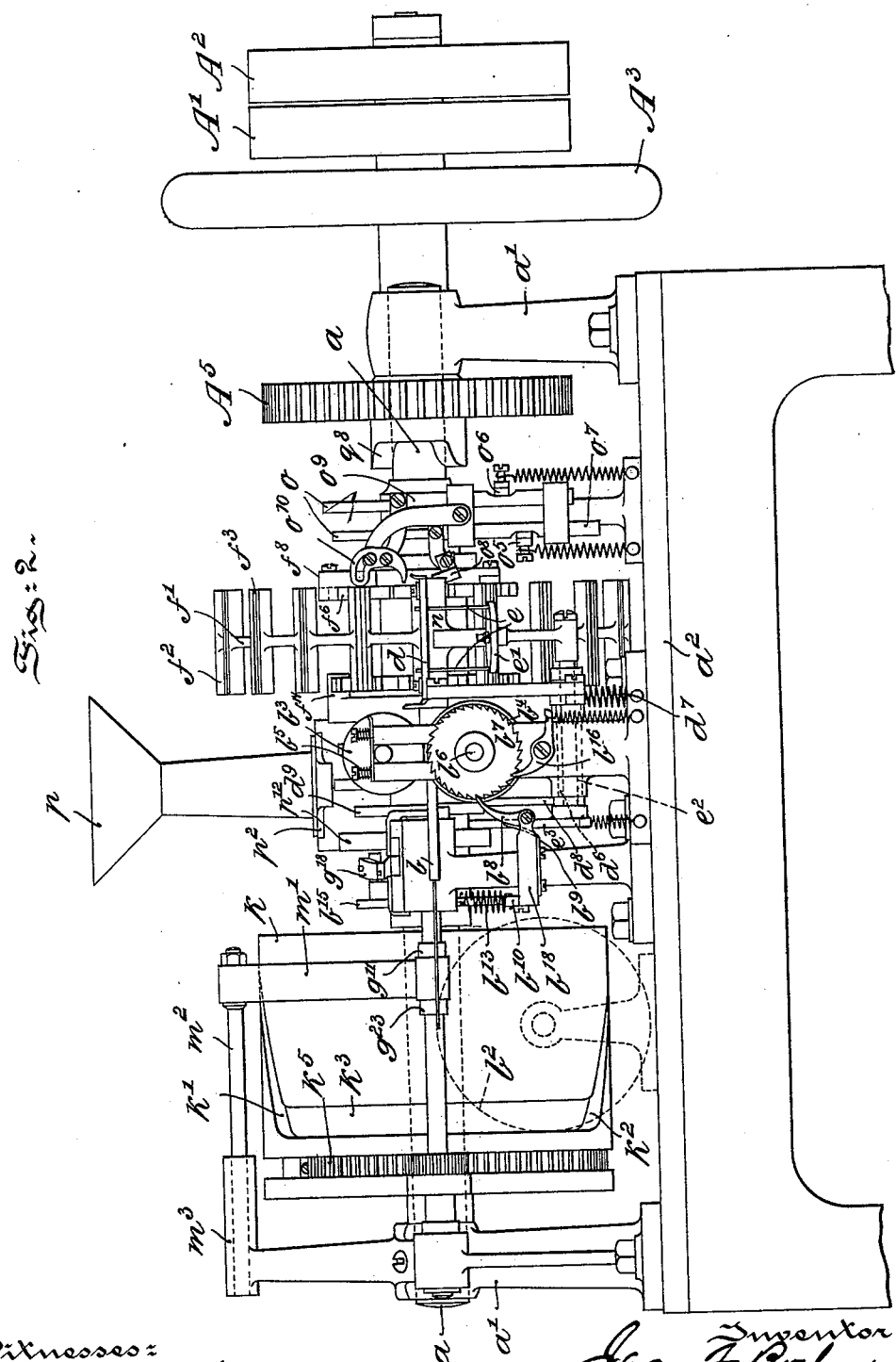
Figure 7:
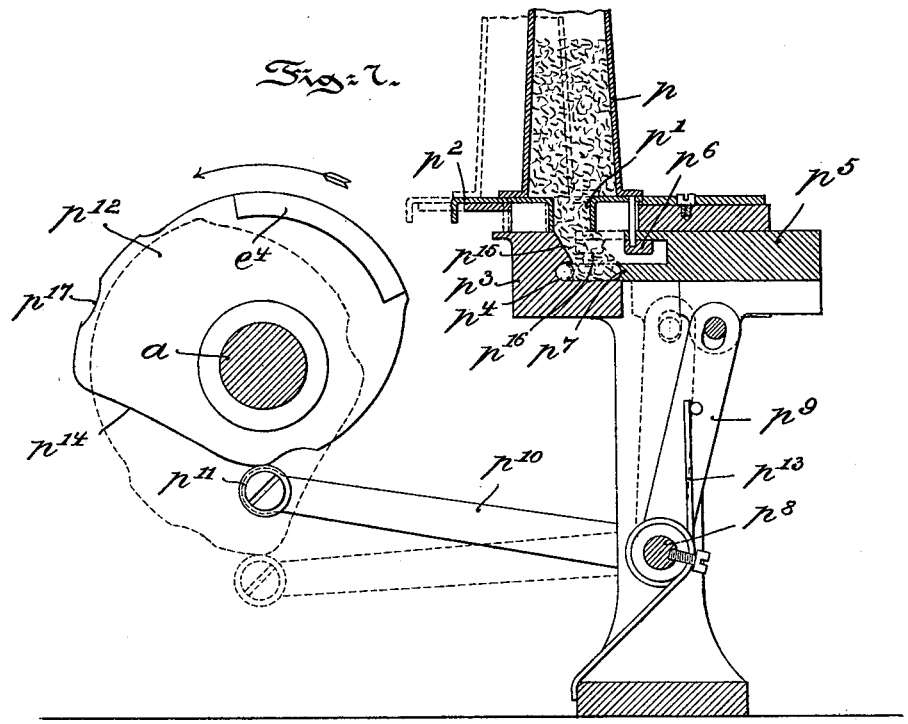
Figures 8, 9, 10, 11:
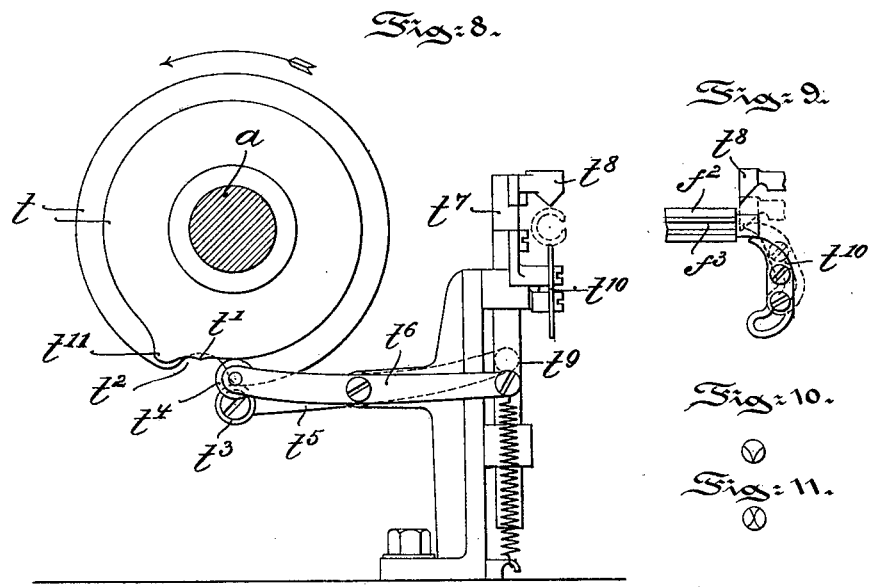

Figure 1 is a top or plan view of a machine embodying main features of my invention, the carrier-wheel being sectioned to more clearly illustrate the construction of the same and its accessories. Fig. 2 is a side elevation of the machine, certain parts being removed to more clearly illustrate other portions of the machine. Fig. 3 is a cross-sectional view on the line 3 3 of Fig. 1, illustrating the paper cutting and feeding mechanism, looking toward the left of the machine. Fig. 4 is an enlarged detail view of the cutting and feeding mechanism illustrated in Fig. 3. Fig. 5 is a cross-sectional view on the line 5 5 of Fig. 1, looking toward the left of the machine. Fig. 6 is a similar view on the line 6 6 of Fig. 1, looking toward the right of the machine. Fig. 7 is an enlarged cross-sectional view of the machine, illustrating in detail the tobacco measuring and compressing mechanism. Fig. 8 is an enlarged detail view illustrating a portion of the device for partially tucking one end of the formed paper tube. Fig. 9 is an enlarged detail view of the device for completely tucking the end of the paper tube, this view being taken at right angles to the view illustrated in Fig. 8. Figs. 10 and 11 are end views of the paper tube, illustrating, respectively, the operation of the tucking devices of Figs. 8 and 9. Fig. 12 is a rear side elevation of a portion of the machine, illustrating the mechanisms for filling the tube with tobacco, tucking in the open end, and ejecting the formed cigarette. Fig. 13 is an enlarged longitudinal sectional view illustrating in detail the mechanism for filling the tube and tucking in the open end, as illustrated in Fig. 12. Fig. 14 is an enlarged detail view of the spring-arms adapted to clamp the open end of the tube during the filling operation; and Figs. 15 to 24, inclusive, are enlarged detail views of the mechanism for forming the paper tube, Figs. 16, 17, and 18 being cross-sectional views on the lines 16 16, 17 17, and 18 18 of Fig. 15, and Figs. 19 and 20 being, respectively, cross-sectional views on the line 19 19 of Fig. 21 and line 20 20 of Fig. 22.

Referring to the drawings, A represents a counter-shaft on which are located the fast and loose pulleys A' and A² and a fly-wheel A³. Power is communicated from the counter-shaft A by gear-wheels A⁴ and A⁵ to the power-shaft $a$ of the machine, which is supported by bearings $a'$ upon the bed-plate $a^2$. On this power-shaft is located all of the means for operating the various mechanisms of the machine.

The paper-feeding mechanism consists, essentially, as illustrated in Figs. 1, 2, 3, 4, and 5, of a platform $b$, supported by the bed-plate $a^2$ of the machine, and having a series of spring guiding-fingers $b'$, under which the paper is fed from a roll or reel $b^2$, as indicated by the dotted lines in Fig. 2, and delivered at a point between two rollers $b^3$ and $b^4$. One of these rollers $b^3$ is suspended in spring-bearings $b^5$, normally tending to press the roll downward upon the other roller $b^4$. On the shaft $b^6$ of the other feed-roller $b^4$ is secured a ratchet $b^7$, which is operated in one direction by a pawl $b^8$, pressed normally against the teeth of the ratchet $b^7$ by a leaf-spring $b^9$. This operating-pawl $b^8$ is carried by an extension $b^{18}$, formed on the end of a lever $b^{10}$, which, as shown in Fig. 5, is pivoted at one end, as at $b^{11}$, on an extension $b^{12}$ of the bed-plate $a^2$ and is normally elevated by a spring or springs $b^{13}$ at the free end. This lever $b^{10}$ is provided with a roller $b^{14}$, resting against the periphery of a four-throw cam or star wheel $b^{15}$, which is carried by the power-shaft $a$ of the machine. During one revolution of the shaft $a$ the lever $b^{10}$ will be elevated and depressed four times by the star-wheel $b^{15}$, and the pawl $b^8$ will advance the ratchet $b^7$ a certain distance during each elevation of the lever. A stop-pawl $b^{16}$ serves to prevent the backward movement of the ratchet $b^7$. As the paper is advanced by the rollers $b^3$ and $b^4$ it is fed to a second platform $d$, arranged alongside the platform $b$, and is cut by a knife $d'$, which is operated in a manner substantially as illustrated in Figs. 1, 2, 3, and 4—that is to say, the knife $d'$ is pivoted, as at $d^2$, to an extension of the bed-plate $a^2$ and its free end $d^3$ is pivotally connected by a link $d^4$ with an arm or lever $d^5$, carried by a tubular rocking shaft $d^6$. The arm or lever $d^5$ is normally depressed by a spring $d^7$ and the shaft $d^6$ is provided with a rocking arm $d^8$, having its free end directly below a single-throw cam $d^9$, located on the main shaft $d$, as shown in Fig. 1. For each revolution of the shaft $a$ the rocking shaft is operated by the cam $d^9$ and elevates the arm $d^5$, which, in turn through the link $d^4$, depresses the knife $d'$ against the tension of the spring $d^7$. The depression of the knife $d'$, acting between the adjacent edges of the two platforms $d$ and $b$, serves to sever the paper into proper lengths. The platform $d$ has one or more spring-fingers $d^{10}$, arranged above the floor of the platform, and below these fingers the paper when severed rests. The platform $d$ is also transversely and vertically slotted, as at $d^{11}$, to permit of the reciprocation of two feeders $e$ $e$, each carried by an arm $e'$, secured at one end to a rocking shaft $e^2$, located within the rocking shaft $d^6$, which is hollow. The rocking shaft $e^2$ is operated by an arm $e^3$, which is depressed by a cam $e^4$, secured to the cam $p^{12}$, located on the shaft $a$, which cam has its throw-surface so arranged with respect to the cam $d^9$ that it will act upon the arm $c^3$ and operate the rock-shaft $e^2$ immediately following the depression of the knife $d'$. Further detailed description of the feeder-arms $e$ $e$ is not deemed necessary in the present application for the reason that these arms and suitable mechanism for operating the same are old and well known in the art. When the feeder-arms $e$ $e$ are thrown forward to the position indicated in dotted lines in Fig. 4, the paper is fed transversely on the platform $d$ and is thereafter formed into a tube by the conjoint action of the mechanism hereinafter described.

Referring now to Figs. 1, 3, and 6, upon the main shaft $a$ is loosely arranged a wheel $f$, consisting of a frame or spider $f'$, carrying a series of longitudinally-split tubular molds $f^2$, the split or slot $f^3$ of each of which is so arranged that as the wheel rotates the slot or split portion of each mold $f^2$ will be presented successively in alinement with the delivery-opening of the platform $d$, as shown in Fig. 4. Step-by-step motion is conveyed to the wheel $f$ by the following preferred mechanism: To the spider or frame $f'$ is secured a ratchet $f^{23}$ and a notched wheel $f^4$, the ratchet and notched wheel being preferably arranged on either side of the carrier-wheel and bolted together by bolts $f^5$, as clearly indicated in Fig. 1, both ratchet and notched wheel being loosely arranged on the main shaft $a$. The ratchet $f^{23}$ is advanced step by step by means of a spring-controlled pawl $f^6$, pivoted to an arm $f^7$, radially arranged with respect to the shaft $a$ and swinging at one end on said shaft. The free end of the radial arm $f^7$ is pivotally connected to one end of the link $f^8$, the other end of which is pivoted to an arm $f^9$, which is pivoted, as at $f^{10}$, to the framework of the machine. This arm $f^9$ has one of its ends normally depressed by a spring $f^{11}$ and its other end normally elevated to raise the link $f^8$ and to advance the radial arm $f^7$ and pawl $f^6$ in one direction. The normally-elevated end of the arm $f^9$ is depressed by a cam $f^{12}$, carried by the shaft $a$. The notched wheel $f^4$ serves as a locking device for the carrier-wheel $f$ and prevents its movement except at the predetermined intervals when the pawl $f^6$ is advanced. Into the notches $f^{13}$ of the wheel $f^4$ is adapted to slide a detent $f^{14}$, carried by a bar $f^{15}$, elliptically slotted, as at $f^{16}$, and working in a vertical direction on the shaft $a$. The lower end of the bar $f^{15}$ slides in a boss or sleeve $f^{17}$, supported by the bed-plate $a^2$, and carries a spindle $f^{18}$, extending through and below the bed-plate $a^2$. The spindle $f^{18}$ has a head $f^{19}$, between which and the under side of the bed-plate $a^2$ is a spring $f^{20}$, coiled about the spindle $f^{18}$, and normally tending to depress the head $f^{19}$, spindle $f^{18}$, and bar $f^{15}$ to thus seat the detent $f^{14}$ in one of the notches $f^{13}$ of the locking-wheel $f^4$. On the bar $f^{15}$ is located a roll $f^{21}$, resting upon the periphery of a single-throw cam $f^{22}$, carried by the shaft $a$, and adapted when rotating to elevate the roll and bar to release the detent from the notches of the locking-wheel $f^4$. The cam $f^{22}$ is so arranged that it will elevate the bar $f^{15}$ to its highest position and thereby unlock the wheel $f^4$ at the precise moment when the pawl $f^6$ advances the ratchet $f^{23}$ and carrier-wheel $f$. The movement of the ratchet $f^{23}$ operates the carrier-wheel $f$, which in its rotation presents successive split molds $f^2$, with their slots $f^3$ in alinement with the delivery end of the platform $d$. At the moment when the slot $f^3$ is thus brought into alinement with the platform $d$ its tubular opening is also brought into alinement with the tube-forming mechanism, and the formation of the tube begins.

By arranging the carrier-wheel, ratchet, and notched wheel as above described loosely upon the main shaft and actuating the same directly from said main shaft instead of, as heretofore, arranging them upon an auxiliary shaft controlled by the main shaft the machine is greatly simplified and made more compact without destroying the delicacy of adjustment required in machines of this type.

By referring to Figs. 1 and 4 and to the details shown in Figs. 15 to 24, inclusive, the construction and arrangement of the tube-forming mechanism will be readily understood. The mechanism consists, essentially, of the shaft $g$, to which reciprocating motion toward and away from the molds $f^2$, as well as a rotary motion within successive molds, are given, as hereinafter described. To the end of the shaft $g$ is bolted or otherwise secured the split sleeve $g'$, forming one half of the tube-forming mechanism, and an enlargement $g^2$ of this split sleeve $g'$ near where the sleeve is joined to the shaft $g$ forms a bearing for the head $g^3$ of the rod $g^4$, which forms the second half of the tube-forming mechanism and is located within the split sleeve $g'$. The head $g^3$ of the rod $g^4$ has one or more pins $g^5$ projecting through and adapted to work in one or more peripherally-arranged slots $g^6$ in the enlargement $g^2$, as indicated in Figs. 18 and 23. That portion of the rod $g^4$ which traverses the split sleeve $g'$ is provided with a rib $g^7$ for a purpose hereinafter described. The pin or pins $g^5$ project through the enlargement $g^2$ and enter and are guided by a spirally-arranged slot or slots $g^8$, cut into a sleeve $g^9$, which is splined to the shaft $g$ and is adapted to slide on said shaft and its enlargement $g^2$, as clearly illustrated in Fig. 15. The sleeve $g^9$ is normally pressed forward to the position indicated in full lines in Fig. 22 and dotted lines in Fig. 15 by the spiral spring $g^{10}$, coiled around the shaft $g$ and impinging against a collar $g^{11}$ of said shaft and the rear headed end $g^{12}$ of said sleeve $g^9$. Referring now to Figs. 1, 15, 16, and 17, the sleeve $g^9$ is retracted on the shaft $g$ to the position indicated in full lines in Figs. 15 and 21 and against the tension of the spring $g^{10}$, as follows: Resting against the headed end $g^{12}$ of the sleeve $g^9$ is a second sleeve $g^{13}$, within which the sleeve $g^9$ is permitted to rotate with the shaft $g$. This second sleeve $g^{13}$ is located and is adapted to slide within a rigid bearing $g^{14}$, supported by the bed-plate $a^2$ of the machine. The sleeve $g^{13}$ is adapted to be slid within the bearing $g^{14}$ to retract the inner sleeve $g^9$ by means of a clutch $g^{15}$, having a finger $g^{16}$ in engagement with the sleeve $g^{13}$, which finger works in a slot $g^{17}$ in the upper portion of the bearing $g^{14}$. The clutch $g^{15}$ is also provided with a fork $g^{25}$, impinging upon the forward end of the sleeve $g^{13}$, as clearly indicated in Figs. 15 and 17. During certain periods in the operation of the machine the clutch $g^{15}$ is retracted by means of the arm $g^{18}$, working in a depression $g^{19}$ of the clutch. As shown in Fig. 1, this arm $g^{18}$ is pivoted, as at $g^{20}$, to a stationary portion of the machine and has its free end provided with a roll $g^{21}$, resting against the periphery of a single-throw cam $g^{22}$, secured to the cam $b^{15}$, which operates the arm $b^{10}$ and pawl $b^8$. The reciprocating motion and the rotary motion to the shaft $g$ and tube-forming mechanism are given by the following preferred means:

Referring to Figs. 1, 2, 5, and 12, on the power-shaft $a$ is secured a drum $k$, having in its periphery a cam slot or groove in four parts—to wit, two spiral portions $k'$ and $k^2$, arranged in opposite trends and adapted to give a forward and backward movement to a roll $m$, traveling in the slot, and two circumferential grooves $k^3$ and $k^4$, arranged, respectively, on the periphery of the drum at or near its forward and rear ends. These slots $k^3$ and $k^4$ form two dwells or intervals between the spiral grooves $k'$ and $k^2$, which grooves are connected with the circumferential grooves $k^3$ and $k^4$. At the rear end of the drum $k$ is secured a toothed sector $k^5$, coextensive with the rear circumferential cam-groove $k^4$, and hence directly opposite to the other groove $k^3$. This sector $k^5$ meshes with a pinion $k^6$, splined to the shaft $g$, during that portion of the revolution of the drum when the roll $m$ is traversing the slot $k^4$ at the forward end of the drum. The roll $m$ is secured to a bail $m'$, which is provided with a pin $m^2$, sliding in a bearing $m^3$, supported by the bed-plate $a^2$ of the machine. In one of the free ends $m^4$ of the bail $m'$ the shaft $g$ is permitted to rotate, and on either side of the end $m^4$ of the bail $m'$ are located the collars $g^{11}$ and $g^{23}$, fixed on the shaft $g$. The bail $m'$, at its other free end $m^5$, slides on a stationary shaft $m^6$, supported in suitable bearings of the machine, the pin $m^2$ and shaft $m^6$ serving as guides to permit the bail $m'$ to reciprocate.

The formation of the paper tube for the cigarette may be briefly described as follows:

A mold $f^2$ being presented to the platform $d$, at the same instant the slot $k'$ operates through the roll $m$ to shift the bail forward or toward the right-hand end of the machine. During this shifting of the bail the sector $k^6$ is out of mesh with the pinion $k^6$, and the shaft $g$ is shifted forward to cause the tube-forming sleeve $g'$ and tube-forming rod $g^4$ to enter the tubular opening of the mold $f^2$. The relative position of the sleeve $g'$ and rod $g^4$ as they enter the mold $f^2$ under tension of the spring $g^{10}$ is shown at Fig. 20. In this, which is the open position of the tube-forming mechanism, the rib $g^7$ rests against the upper edge of the slot of the tube-forming sleeve $g'$. The paper is now fed from the platform $d$ until its edge rests on the lower edge of the slot of the sleeve $g'$, whereupon the side cam $g^{22}$ of the cam $b^{15}$ on the power-shaft $a$ throws the clutch $g^{15}$ backward. This movement of the clutch $g^{15}$ retracts the slotted sleeve $g^9$ against the tension of the spring $g^{10}$, and thus, as before explained, turns the rod $g^4$ until its rib $g^7$ rests upon the paper, thereby clamping the paper between the sleeve $g'$ and the rod $g^4$, as indicated at Fig. 19. At the next instant the roll $m$ of the bail enters the first circumferential groove $k^4$, and the bail remains stationary while the roll $m$ travels through the groove. During this interval the sector $k^5$ meshes with the pinion $k^6$ and rotates the shaft $g$. The shaft $g$ in rotating carries with it the two members of the tube-forming mechanism which roll the clamped paper around the sleeve $g'$, as shown in Fig. 4. When the paper has been thus rolled, the clutch $g^{15}$ is released, and the spring $g^{10}$ shifts the sleeve $g^9$ and opens the two members of the tube-forming device. The bail is now moved backward by the second spiral groove $k^2$ and retracts the shaft $g$ and the two members of the tube-forming mechanism from the mold $f^2$, leaving the paper tube inside the mold.

During the operation of the tube-forming mechanism the paper is held under tension by a knife $n$, substantially as illustrated in Fig. 4. The knife $n$ slides in a block or guideway $n'$, secured to the base of the platform $d$ at its delivery edge. From the base of the knife $n$ projects the block $n^2$, the lower end of which is connected by springs $n^3$ to the base of the arm $e'$ of the two paper-feeders $e$ $e$, so that the knife $n$ will be normally under spring tension. The block $n^2$ has a transverse recess $n^4$, in which is guided a curved or cam arm $n^5$, projecting from the arms $e^2$ of the paper-feeders $e$ $e$. As these feeders are retracted after feeding the paper to the edge of the platform $d$ and adjacent to the mold $f^2$ the curved or cam arm $n^5$ traverses the recess $n^4$ and gradually elevates the knife $n$, which when fully elevated will hold the end of the paper against the upper edge of the platform $d$ and maintain it under tension during the final rolling of the same into a tube.

During the formation of the tube that portion of the paper which is initially clamped to the tube-forming sleeve $g'$ by the rib $g^7$ projects inwardly in the form of a longitudinal rib or projection; but when the tube-forming mechanism is withdrawn from the mold the paper of the tube being resilient causes this rib or projection to disappear, as it will then conform to the inner wall of the tube.

After the tube has been formed and before it is carried away by the carrier-wheel $f$ and ratchet $f^{23}$ it rests in the mold with both ends of the tube projecting some distance beyond the ends of the mold $f^2$. The next operation when a tucked-in-end cigarette is to be formed is to tuck in one of the projecting ends of the tube prior to its presentation to the filling mechanism. This tucking mechanism for both ends is similar in all essential respects and is shown in detail at Figs. 1, 2, 3, 8, and 9. It consists, essentially, of two devices, one to make the downward vertical crease (illustrated at Fig. 10) and the other to make the upward vertical crease and complete the tucking. (Shown at Fig. 11.)

Referring particularly to Figs. 1, 2, and 3, upon the power-shaft $a$ of the machine is placed a double cam $o$, the construction of which is like the cam $t$ (shown in Fig. 8) for the second tucker—that is to say, the periphery of one face of the cam has a double projection like projections $t'$ and $t^{11}$, while the periphery of the other face has a depression like the depression $t^2$, slightly in advance of the projection $t'$ and opposite the other projection $t^{11}$. On the periphery of each face of the cam $o$ rides the rolls like the rolls $t^3$ and $t^4$, respectively, and each roll is carried at one end of the lever-arm $o^5$ and $o^6$, respectively, which are pivoted midway of their ends to a fixed portion of the machine. The other end of each lever-arm $o^5$ and $o^6$ is normally held down, as shown at Fig. 2, under spring tension to present the rolls to the working periphery of the double cam. The lever-arm $o^5$ is secured to a vertically-sliding bar $o^7$, carrying the wedge $o^8$, adapted to form the upward crease or fold in the tube, and the arm $o^6$ is secured to a vertical slide-bar $o^9$, carrying the pivoted latch $o^{10}$, adapted to form the downward fold or crease in the tube during the first tucking operation. As illustrated in Fig. 8, the wedge $t^8$, however, forms the downward crease, whereas the latch $t^{10}$ the upward crease of the tuck.

Referring to Fig. 8, the operation of the tucking device is as follows: The wedge is first depressed by the depression in the operating-cam and forms a downward crease, and at the same instant the first projection of the cam causes the latch to be slightly elevated to press inward toward the center of the tube the crease formed by the wedge. At the next instant the latch is operated by the second projection and completes the tuck. The manner in which the tucking mechanism performs the various operations is well known in the art and is illustrated, for instance, in detail in the Letters Patent No. 586,599 granted to F. Girard July 20, 1897, and hence further description in the present application is not deemed necessary. The tube with one end tucked is next transferred by the carrier-wheel to the opposite side of the machine, where the tobacco is fed, measured, compressed, and forced into the tube.

When loose, granulated, and dry tobacco is used for a filler, a feeding, measuring, and compressing device (illustrated in detail at Fig. 7 of the drawings) may preferably be used. It consists, essentially, of a pyramidal-shaped hopper $p$, into the upper contracted end of which tobacco is placed and caused in its descent to the enlarged base to expand and to loosen up prior to its discharge through the opening $p'$ at the base. The hopper is secured at its base to a sliding support $p^2$, carrying the outlet $p'$, and adapted to slide the outlet $p'$ over a fixed table $p^3$, in which is formed a die $p^4$, forming one-half of a round receptacle in which the tobacco is to be compressed. The support $p^2$ is carried by a sliding block $p^5$, having a projection $p^6$ and carrying below the projection the other die $p^7$, adapted to complete the round receptacle in which the tobacco is compressed. The block $p^5$ and the support $p^2$ and hopper $p$, carried by it, are moved toward and away from the table $p^3$ by means of a rocking shaft $p^8$ and arm $p^9$, connecting the shaft with the block $p^5$. The shaft $p^8$ is preferably rocked by an arm $p^{10}$, fastened to the shaft and provided with a roll $p^{11}$, sliding over the periphery of a cam $p^{12}$, carrying the side cam $e^4$, which operates the arms $e^2$ of the paper-feeders $e$ $e$, secured on the driving-shaft $a$ and rotating therewith. One or more springs $p^{13}$, bent around the shaft $p^8$ and impinging at one end against a projection on the bed-plate $a^2$ and at the other end against a pin or projection on the rocking arm $p^9$, serve to throw the arm $p^9$ toward the right, and to thus maintain the roll $p^{11}$ of the arm $p^{10}$ against the periphery of the cam $p^{12}$. The cam $p^{12}$ is provided with a throw-surface $p^{14}$, which, acting upon the roll $p^{11}$, causes the block $p^5$ and accessories to approach the fixed table $p^3$ until the two dies form the round receptacle for the tobacco.

The operation of the tobacco feeding, measuring, and compressing device is as follows: The tobacco falls down through the hopper $p$ and passes into the outlet $p'$. When the support $p^2$ is in the position illustrated in full lines in Fig. 7, the tobacco will pass through the outlet $p'$ and down the inclined face $p^{15}$ of the fixed table $p^3$ into the space $p^{16}$ between the retracted support $p^2$ and the table. As the cam $p^{12}$ rotates the support $p^2$ is caused to approach the table $p^3$ and the outlet $p'$ slides onto the top of said table, cutting off the feed of the tobacco from the hopper. The projection $p^6$ of the support $p^2$ forces the tobacco downward into the space between the dies $p^4$ and $p^7$, and upon the further approach of the support toward the table the two dies meet and compress the tobacco into a cylindrical plug or roll. The cam $p^{12}$ has a slight depression $p^{17}$ immediately preceding its throw-surface $p^{14}$, and this depression serves to slightly jolt the rocking arms, shaft, support, and hopper to thereby dislodge any tobacco which may stick to the walls of the hopper and cause the tobacco to be fed with regularity. After the tobacco has been thus compressed it is ready for the next step—namely, its insertion into the formed tube, having one end tucked in and the other open. The formed tube with one end tucked in is carried by the carrier-wheel until its open end comes into alinement with the round receptacle between the dies $p^4$ and $p^7$, whereupon the compressed tobacco is forced into the tube in the following manner:

Referring to Figs. 1, 3, 12, 13, and 14, alongside the table $p^3$ is located a plate $q$, carrying a tube $q'$, the interior of which registers with and forms an extension of the round receptacle formed by the closed dies $p^4$ and $p^7$. When the formed paper tube comes into alinement with the tube $q'$, its open end is forced over and confined to the exterior of the tube $q'$ to prevent bursting of the paper tube during the filling operation. To cause the open end of the paper tube to fit over the tube $q'$, a spring-controlled plunger $q^2$ is pressed against the tucked end of the paper tube, causing the paper tube to slide in the mold $f^2$ until its open end fits over the tube $q'$, as indicated in Fig. 13. The plunger $q^2$ is operated by a lever $q^3$, having a forked end $q^4$, in which fit suitable pins or projections $q^5$ on the plunger $q^2$. The lever $q^3$ is pivoted, as at $q^6$, to a stationary portion of the machine, and its free end is provided with a roll $q^7$, bearing against the periphery of a cam $q^8$ on the power-shaft $a$ and having a throw-surface of required shape. A spring $q^9$, coiled around the plunger $q^2$, serves normally to throw the plunger $q^2$ so that it will partially eject the formed paper tube from the mold $f^2$, and the lever $q^3$ operates the plunger $q^2$ at suitable intervals against the tension of said spring. After the open end of the paper tube encircles the tubular extension $q'$ two spring-controlled fingers $r$ (see Figs. 13 and 14) clamp the paper tube to the extension $q'$. These fingers $r$ are pivoted, as at $r'$, to the table $p^3$ and are normally closed by a spring $r^2$, which connects the fingers $r$ at their ends. The free ends of said fingers rest in a block $r^3$, carried by a lever-arm $r^4$, projecting from the rocking shaft $p^8$, and when said block $r^3$ and arm $r^4$ are rocked in one direction the free ends of the fingers are caused to approach each other and the other ends of the fingers separate against the tension of the spring $r^2$. When the arm $r^4$ and the block $r^3$ rock in the opposite direction, the spring $r^2$ is permitted to clamp the ends of the fingers down upon the tube $q'$. After the paper tube has been caused to encircle the tubular extension $q'$ and held to position by the fingers $r$ a plunger-rod $s$ is forced through the receptacle between the dies $p^4$ and $p^7$ and presses the compressed tobacco into the paper tube. At this moment the plunger $q^2$ is released from the tucked end of the paper tube and retracted by the lever $q^3$, and the compressed tobacco as it is forced into the paper tube causes said paper tube to resume its natural position in the mold. The plunger-rod $s$ slides in a bearing $s'$, projecting from the bed-plate $a^2$, and is operated by the bail $m'$, to which it is secured, as at $s^2$, when said bail is reciprocated, as hereinabove described. After the paper tube is filled with tobacco the mold carrying the tube is advanced one step to bring the open end opposite the tucking-wedge $t^8$ and latch $t^{10}$, which are operated in the same manner as the wedge $o^8$ and latch $o^{10}$, which tucked the other end of the tube prior to its being filled—that is, a double cam $t$ on the shaft $a$ operates the levers $t^5$ and $t^6$ to raise and lower the bars $t^7$ and $t^9$, carrying the wedges $t^8$ and latch $t^{10}$ at the proper intervals of time. While the second tucking operation is proceeding, the end of the paper tube already tucked in rests against a stop $u$, carried by an arm $u'$, projecting downward from the plunger $q^2$, as illustrated in Figs. 12 and 13. After the cigarette has been thus formed it is ejected from one of the molds $f^2$ by means of a rod $v$, carried by the bail $m'$, and caused by the reciprocation of said bail to traverse the mold, as indicated by the dotted lines in Fig. 12.

It is to be understood that the paper-feeding and other devices hereinabove described, with the exception of the tucking device, may be used conjointly in the formation of a cigarette the tube of which is pasted, provided that in place of the tucking device a pasting device of required arrangement be used—such, for instance, as that described and claimed in an application for Letters Patent filed by me under date of July 5, 1898, Serial No. 685,086, and pending herewith.

That which is shown and described in the present application and is also shown, described, and claimed in the application under Serial No. 685,086 is not claimed herein.

Having thus described the nature and objects of my invention, what I claim as new, and desire to secure by Letters Patent, is—

1. In a machine of the character described, a carrier-wheel consisting of a frame or spider carrying a series of longitudinally-split tubular molds, a continuously-rotating power-shaft upon which the frame is loosely supported, a ratchet secured to the frame, and means controlled by said shaft for operating said ratchet and to thereby rotate said carrier-wheel on said power-shaft, substantially as and for the purposes described.

2. In a machine of the character described, a continuously-rotating power-shaft, a carrier-wheel loosely supported upon said shaft and comprising a series of split tubular molds carried by a frame or spider, a ratchet arranged loosely on said shaft and secured to said frame, means controlled by the shaft for operating said ratchet to rotate the carrier-wheel on the shaft, a locking-wheel arranged loosely on said shaft and secured directly to said frame, and means controlled by said shaft for alternately locking and releasing said locking-wheel, substantially as and for the purposes described.

3. In a machine of the character described, a power-shaft, a carrier-wheel loosely supported on said shaft and comprising a series of split tubular molds carried by a suitable frame, a ratchet located on one side of said frame and loosely supported on the shaft, a notched locking-wheel located on the other side of the frame and also loosely supported on the shaft, said ratchet, frame and notched wheel being securely united together, a pawl and lever adapted to operate the ratchet to rotate the carrier-wheel on the shaft, a vertically-movable detent adapted to control the notched wheel, and two cams located upon the power-shaft and adapted to operate respectively the ratchet-operating pawl and lever and the notched detent for the wheel in such a manner that the detent is brought out of engagement with the notched wheel only when the ratchet is operated, substantially as and for the purposes described.

4. In a machine of the character described, a tobacco feeding and measuring device comprising a pyramidal-shaped hopper, a reciprocating support to which the base of said hopper is secured, there being an outlet formed in said support and leading from the base of the hopper, a stationary table located below the support and provided with a recess for the reception of the tobacco, a separable die located below said recess and adapted to receive tobacco therefrom, and means controlled by the power-shaft of the machine for reciprocating said support and hopper upon said table and to thereby open and close said die, substantially as and for the purposes described.

5. In a machine of the character described, a tobacco-compressing device comprising a fixed table, a die formed in the table and adapted to form one half of a round receptacle for the tobacco, a support adapted to slide on said table, a second die formed in said support and adapted to form the other half of said receptacle, a hopper carried by said support, a recess formed between the table and support below the outlet from said hopper, and means controlled by the power-shaft of the machine for reciprocating the support to cause the dies to close and open, substantially as and for the purposes described.

6. In a machine of the character described, a tobacco-hopper, a reciprocating support to which said hopper is secured, an outlet formed in said support, a compressing-die in communication with said outlet, a rocking cam adapted to reciprocate the support, a rocking shaft carrying said arm, a cam located on the power-shaft of the machine and having a throw-surface adapted to rock said shaft, and a depression formed in the surface of said cam in advance of the throw, whereby the shaft may be preliminarily rocked to thereby jolt the support and hopper, substantially as and for the purposes described.

In testimony whereof I have hereunto set my signature in the presence of two subscribing witnesses.

JEAN F. BREHM.

Witnesses:
THOMAS M. SMITH,
J. WALTER DOUGLASS.